United States Patent
Raghavan et al.

(10) Patent No.: US 9,846,639 B2
(45) Date of Patent: Dec. 19, 2017

(54) SYSTEM AND METHOD FOR AUTOMATICALLY TESTING AN APPLICATION PROGRAMMING INTERFACE (API)

(71) Applicant: HCL Technologies Limited, Uttar Pradesh (IN)

(72) Inventors: Madhava Venkatesh Raghavan, Tamil Nadu (IN); Rajesh Venkatesan, Tamil Nadu (IN)

(73) Assignee: HCL Technologies Ltd. (IN)

( * ) Notice: Subject to any disclaimer, the term of this patent is extended or adjusted under 35 U.S.C. 154(b) by 0 days.

(21) Appl. No.: 15/056,466

(22) Filed: Feb. 29, 2016

(65) Prior Publication Data
US 2016/0283364 A1    Sep. 29, 2016

(30) Foreign Application Priority Data
Mar. 24, 2015  (IN) .............................. 812/DEL/2015

(51) Int. Cl.
*G06F 11/36*        (2006.01)
(52) U.S. Cl.
CPC ...... *G06F 11/3692* (2013.01); *G06F 11/3684* (2013.01); *G06F 11/3688* (2013.01)
(58) Field of Classification Search
CPC ............. G06F 11/3688; G06F 11/3684; G06F 11/3692
See application file for complete search history.

(56) References Cited

U.S. PATENT DOCUMENTS

| 7,272,822 | B1 | 9/2007 | Riggins et al. | |
|---|---|---|---|---|
| 7,603,658 | B2 * | 10/2009 | Subramanian | G06F 11/3664 717/124 |
| 2012/0174075 | A1 * | 7/2012 | Carteri | G06F 11/3688 717/127 |
| 2013/0159784 | A1 * | 6/2013 | Rossi | G06F 11/263 714/47.1 |

OTHER PUBLICATIONS

Ali Mesbah & Arie Van Deursen, Invariant-Based Automatic Testing of AJAX User Interfaces, Delft University of Technology Software Engineering Research Group Technical Report Series, p. No. 1-12, Netherlands.

* cited by examiner

*Primary Examiner* — Li B Zhen
*Assistant Examiner* — Amir Soltanzadeh
(74) *Attorney, Agent, or Firm* — Hayes Soloway PC

(57) ABSTRACT

Disclosed is a method and system for automatically testing an API. The system may determine a type of the API, inputs handled and outputs generated by the API. The system may identify a web application template for invoking the API. Further, the system may generate a Hyper Text Markup Language (HTML) page for accepting input parameters. The system may then create input data elements using the input parameters. The system may invoke the API using the input data elements in order to generate output. The system may generate another HTML page for providing the output. The system may generate a set of test scripts for accepting inputs from a data file and then receive the inputs in the first HTML form. The system may submit the first HTML form to generate final outputs by the API. Further, the system may verify the final outputs in order to test the API.

7 Claims, 4 Drawing Sheets

Details of a person

| Age | 20 |
|---|---|
| First Name | Rajesh |
| Last Name | Venkatesan |

Add

| Qualification | Bachelor of Engineering |
|---|---|
| State | Tamil Nadu |

| Course |
|---|
| Big Data |

FIG. 2

SYSTEM AND METHOD FOR AUTOMATICALLY TESTING AN APPLICATION PROGRAMMING INTERFACE (API)

CROSS-REFERENCE TO RELATED APPLICATIONS AND PRIORITY

The present application claims benefit from Indian Complete Patent Application No. 812/DEL/2015, filed on Mar. 24, 2015, the entirety of which is hereby incorporated by reference.

TECHNICAL FIELD

The present subject matter described herein, in general, relates to testing an Application Programming Interface (API).

BACKGROUND

An application exposes business logic via Application Programming Interfaces (API's). The API's refer to a set of routines, protocols, and program instructions for building a software application. The standard API mechanisms may comprise a Simple Object Access Protocol (SOAP), Representational State Transfer/Extended Markup Language (REST/XML), and Representational State Transfer/Java script Object Notation (REST/JSON). The SOAP based API's allow heterogeneous applications to communicate with each other over Hypertext Transfer Protocol (HTTP) as well as other protocols like Java Message Service (JMS).

Traditionally, the API's are tested manually by a software developer i.e. a technical expert having proficient knowledge of programming languages. In order to test, the API's are invoked remotely using standard API invocation mechanisms. For testing the API's, code wrappers are generated to record and playback functioning of the API's. Further, program codes are written manually for creating a GUI to invoke the API's, so as to test the API's. Programming knowledge or knowledge of a tool used to invoke the API is required for testing the API's. Thus, it is a tedious task to test the API's using conventional techniques.

SUMMARY

This summary is provided to introduce aspects related to systems and methods for automatically testing an Application Programming Interface (API) and the aspects are further described below in the detailed description. This summary is not intended to identify essential features of the claimed subject matter nor is it intended for use in determining or limiting the scope of the claimed subject matter.

In one implementation, a method for automatically testing an Application Programming Interface (API) is disclosed. The method may comprise determining a type of API, a type of input data elements processed by the API, and a type of output generated by the API. The method may comprise identifying a web application template based on the type of API. The web application template may comprise libraries required for invoking the API. The method may further comprise generating a first Hyper Text Markup Language (HTML) page comprising a HTML form. The HTML form may comprise User Interface (UI) elements to be mapped with input parameters. The method may further comprise creating input data elements using the input parameters received from the HTML form. The method may also comprise invoking the API using the input data elements to generate an output. The method may further comprise generating, by the processor, a second HTML page for providing the output generated by invoking the API. The second HTML page is created based on the type of output generated by the API. The method may comprise generating a set of test scripts for accepting inputs from a data file. The method may further comprise receiving the inputs in the first HTML form. The method may comprise submitting the first HTML form to generate final outputs by the API. The method may further comprise verifying the final outputs by matching the final outputs with expected outputs stored in the data file. Thus, the API may be automatically tested, in an above described manner.

In one implementation, a system for automatically testing an Application Programming Interface (API) is disclosed. The system comprises a processor and a memory coupled to the processor for executing programmed instructions stored in the memory. The processor may determine a type of API, a type of input data elements processed by the API, and a type of output generated by the API. The processor may further identify a web application template based on the type of API. The web application template may comprise libraries required for invoking the API. The processor may further generate a first Hyper Text Markup Language (HTML) page comprising a HTML form. The HTML form may comprise User Interface (UI) elements to be mapped with input parameters. The processor may further create input data elements using the input parameters received from the HTML form. The processor may invoke the API using the input data elements to generate an output. The processor may generate a second HTML page for providing the output generated by invoking the API. The second HTML page may be created based on the type of output generated by the API. The processor may generate a set of test scripts for accepting inputs from a data file. The processor may receive the inputs in the first HTML form. The processor may submit the first HTML form to generate final outputs by the API. The processor may verify the final outputs by matching the final outputs with expected outputs stored in the data file. Thus, the API may be automatically tested, using the above described system.

In one implementation, a non-transitory computer readable medium embodying a program executable in a computing device for automatically testing an Application Programming Interface (API) is disclosed. The program may comprise a program code for determining a type of API, a type of input data elements processed by the API, and a type of output generated by the API. The program may further comprise a program code for identifying a web application template based on the type of API. The web application template may comprise libraries required for invoking the API. The program may further comprise a program code for generating a first Hyper Text Markup Language (HTML) page comprising a HTML form. The HTML form may comprise User Interface (UI) elements to be mapped with input parameters. The program may further comprise a program code for creating input data elements using the input parameters received from the HTML form. The program may further comprise a program code for invoking the API using the input data elements to generate an output. The program may further comprise a program code for generating a second HTML page for providing the output generated by invoking the API. The second HTML page may be created based on the type of output generated by the API. The program may further comprise a program code for generating a set of test scripts for accepting inputs from a data file. The program may further comprise a program code for receiving the inputs in the first HTML form. The program may further comprise a program code for submitting the first HTML form to generate final outputs by the API. The program may further comprise a program code for verifying the final outputs by matching the final outputs with expected outputs stored in the data file. Thus, the API may be automatically tested, in an above described manner.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 2 illustrates an exemplary user interface for accepting input parameters to be used for testing the API, in accordance with an embodiment of the present subject matter.

DETAILED DESCRIPTION

System and method for automatically testing an Application Programming Interface (API) is described in the present subject matter. The system may determine a type of API, a type of input data elements processed by the API, and a type of output generated by the API. Based on the type of API, the system may identify a web application template comprising libraries required for invoking the API. The system may generate a first Hyper Text Markup Language (HTML) page comprising a HTML form. The HTML form may comprise User Interface (UI) elements for receiving input parameters. The system may create input data elements using the input parameters received from the HTML form. The system may invoke the API using the input data elements to generate at least one output. The system may then generate a second HTML page based on the type of output generated by the API. The second HTML page may be used to provide the output generated by the API when invoked using the input data elements.

Post generating the second HTML page, the system may generate a set of test scripts for accepting inputs from a data file. The system may receive the inputs, accepted from the data file, in the first HTML form. The system may then submit the first HTML form to generate final outputs by the API. Further, the system may verify the final outputs by matching the final outputs with expected outputs stored in the data file, in order to test the API automatically.

While aspects of described system and method for automatically testing an API may be implemented in any number of different computing systems, environments, and/or configurations, the embodiments are described in the context of the following exemplary system.

Figure 1:
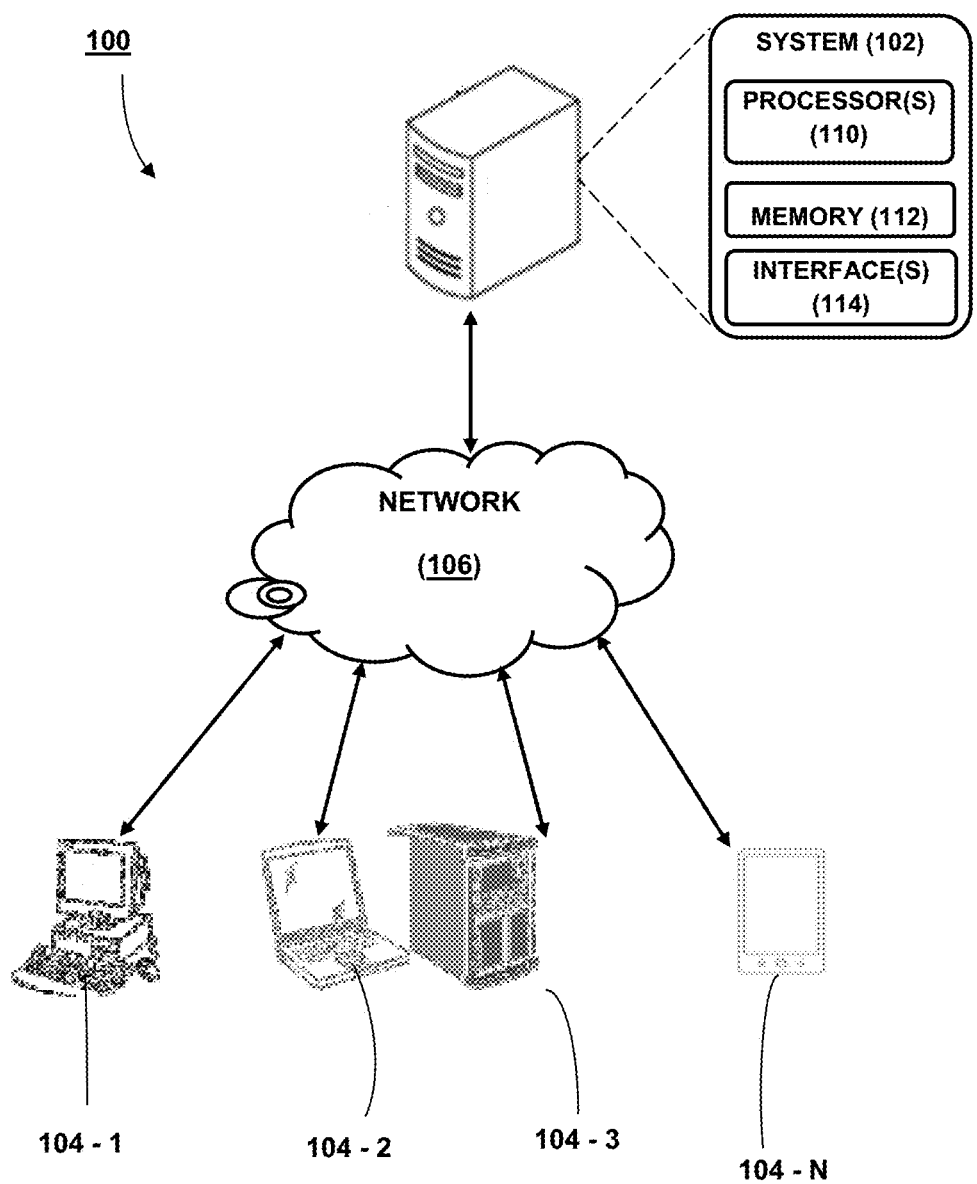
FIG. 1 illustrates a network implementation of a system for automatically testing an Application Programming Interface (API), in accordance with an embodiment of the present subject matter.

Referring now to FIG. 1, the system 102 for automatically testing an Application Programming Interface (API) is shown, in accordance with an embodiment of the present subject matter. Although the present subject matter is explained considering that the system 102 is implemented on a computer, it may be understood that the system 102 may also be implemented in a variety of computing systems including but not limited to, a smart phone, a tablet, a notepad, a personal digital assistant, a handheld device, a laptop computer, a notebook, a workstation, a mainframe computer, a server, and a network server, a tablet, a mobile phone, and the like. In one embodiment, the system 102 may be implemented in a cloud-based environment. It will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer with a webcam, a personal digital assistant with a camera, a handheld device with a camera, and a digital camera. The user device 104 is communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 110, a memory 112, and input/output (I/O) interfaces 114. Further, the at least one processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 112.

The I/O interfaces 114 may include a variety of software and hardware interfaces, for example, a web interface, a graphical user interface, and the like. The I/O interfaces 114 may allow the system 102 to interact with a user directly. Further, the I/O interfaces 114 may enable the system 102 to communicate with other computing devices, such as web servers and external data servers (not shown). The I/O interfaces 114 can facilitate multiple communications within a wide variety of networks and protocol types, including wired networks, for example, LAN, cable, etc., and wireless networks, such as WLAN, cellular, or satellite.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the system 102 may accept the API to be tested. Subsequently, the system 102 may determine a type of the API. The type of API, determined by the system 102, may be at least one of Representational State Transfer/JavaScript Object Notation (REST/JSON), Representational State Transfer/Extended Markup Language (REST/XML), Simple Object Access Protocol (SOAP), and Normal Java Code. The system 102 may also determine a type of input data elements processed by the API, and a type of output generated by the API. The output may be generated as a result of processing of the input data parameters.

In one embodiment, the system 102 may comprise web application templates. Each web application template may be predefined and may comprise libraries required for invoking the API. For example, the web application templates may be defined for REST/JSON, REST/XML, and SOAP. The system 102 may identify a web application template based on the type of API, determined by the system 102 in a previous step.

Subsequent to identification of the web application template, the system 102 may generate a first Hyper Text Markup Language (HTML) page comprising a HTML form. The HTML form may comprise User Interface (UI) elements to be mapped with input parameters. For example, a string may be mapped with a textbox or a text area, an integer may be mapped to a text box for an integer, an integer having a range may be mapped with a combo box with prepopulated values lying within the range, and a date may be mapped to a calendar along with a time. Further, complex input parameters may also be mapped by the system. For example, a custom class of data or a collection of data like a list or a map may be mapped in multiple iterations. Each attribute of the class may be mapped may be iterated for mapping to the UI elements.

In one embodiment, the system 102 may use automation test scripts to accept the input parameters. The input parameters may be accepted by the system 102 from a data file. For example, the data file may be an excel sheet or a Character Separated Values (CSV) file comprising the input parameters. The automation test scripts may receive the input parameters present in the excel sheet or the CSV file. FIG. 2 illustrates an exemplary user interface for accepting the input parameters to be used for testing the API. As shown in the FIG. 2, the input parameters may include age, first name, last name, qualification, and state.

Post receiving the input parameters, the system 102 may create input data elements using the input parameters. The system 102 may put the input parameters into a format accepted by the API and thus create the input data elements. The system 102 may then invoke the API using the input data elements. Data structures of the input data elements and output data elements for the API may be present in a Web Services Description Language (WSDL) file. In one embodiment, the system 102 may be programmed to accept the input parameters, creating the input data elements, and invoking the API using a programming language such as Java Servlets, C#, Ruby on Rails, and the like. For example, the API being invoked using the input data elements as information about a person and a course to be applied may be represented as mentioned below.

Eligibility Status is Eligible (Person p, String course)

Upon invocation of the API, an output may be generated by the API. For example, the above mentioned API may return an output as an eligibility status of the person for the course. Data structure representing the information about a person and the eligibility status of the person may be as mentioned below.

| Information of a person |
| --- |
| first Name: String |
| last Name: String |
| age: int |
| qualification: String [*] |
| state: String |

| Eligibility Status |
| --- |
| status: short |
| reason: String |

Upon generating the invocation of the API, an output may be generated by the API. The output of the API may be used by the system 102 to generate a second HTML page for providing the output to a user. In one case, the output may be printed. The second HTML page may be created based on the type of output generated by the API. Further, the system 102 may create the second HTML page based on the WSDL file. In another case, the system may create the second HTML page by understanding the output by processing a source code. In case, the output is a basic data type like a string, integer, decimal and the like, the output may be provided through the second HTML page. In another case when the output is complex i.e. a custom class, the system may execute multiple iterations through the class in order to present each attribute of the class.

For example, the above mentioned API may generate the output comprising the eligibility status as eligible or ineligible, and a status code. In a case, the input parameters i.e. information of a person may be as mentioned below in a tabular form.

| Age | First Name | Last Name | Qualification |
| --- | --- | --- | --- |
| 20 | Mahesh | Singh | B.E. |
| 22 | Amit | Kumar | L.L.B |
| 26 | Vivek | Sharma | L.L.M. |
| 21 | Naresh | Lal | B. Sc. |
| 18 | Vipul | Naik | B. Ed. |
| 23 | Xxyy | Kaul | M. Sc. |

The output comprising status codes and significances of the status codes may be as mentioned below.

| Status codes | Significances of the status codes |
| --- | --- |
| 200 | Eligible |
| 204 | Qualification criteria not met |
| 200 | Eligible |
| 300 | Course full |
| 302 | Age criteria not met |
| 400 | Invalid first name |

Post generating the second HTML page, the system 102 may generate a set of test scripts for accepting inputs from the data file. The system 102 may receive the inputs in the first HTML form i.e. the inputs may be filled in the first HTML form. The system 102 may then submit the first HTML form for generating final outputs by the API. In order to determine a proper functioning of the API, the system 102 may verify the final outputs. In one case, the final outputs may be verified by matching the final outputs with expected outputs stored in the data file.

In one embodiment, the system 102 may generate a template excel sheet or a template CSV file comprising name of the input parameters. The user i.e. software tester may use the template excel sheet or the template CSV file to provide different types of data as the input parameters. Thus, the system may help the user in identifying the type of input parameters handled by the API, without having to understand a structure of the API. The different types of data may thus be used by the system 102 to test the API in an automatic manner. Hence, the system 102 may automatically test the Application Programming Interface (API) using an above described method.

Figure 3A:
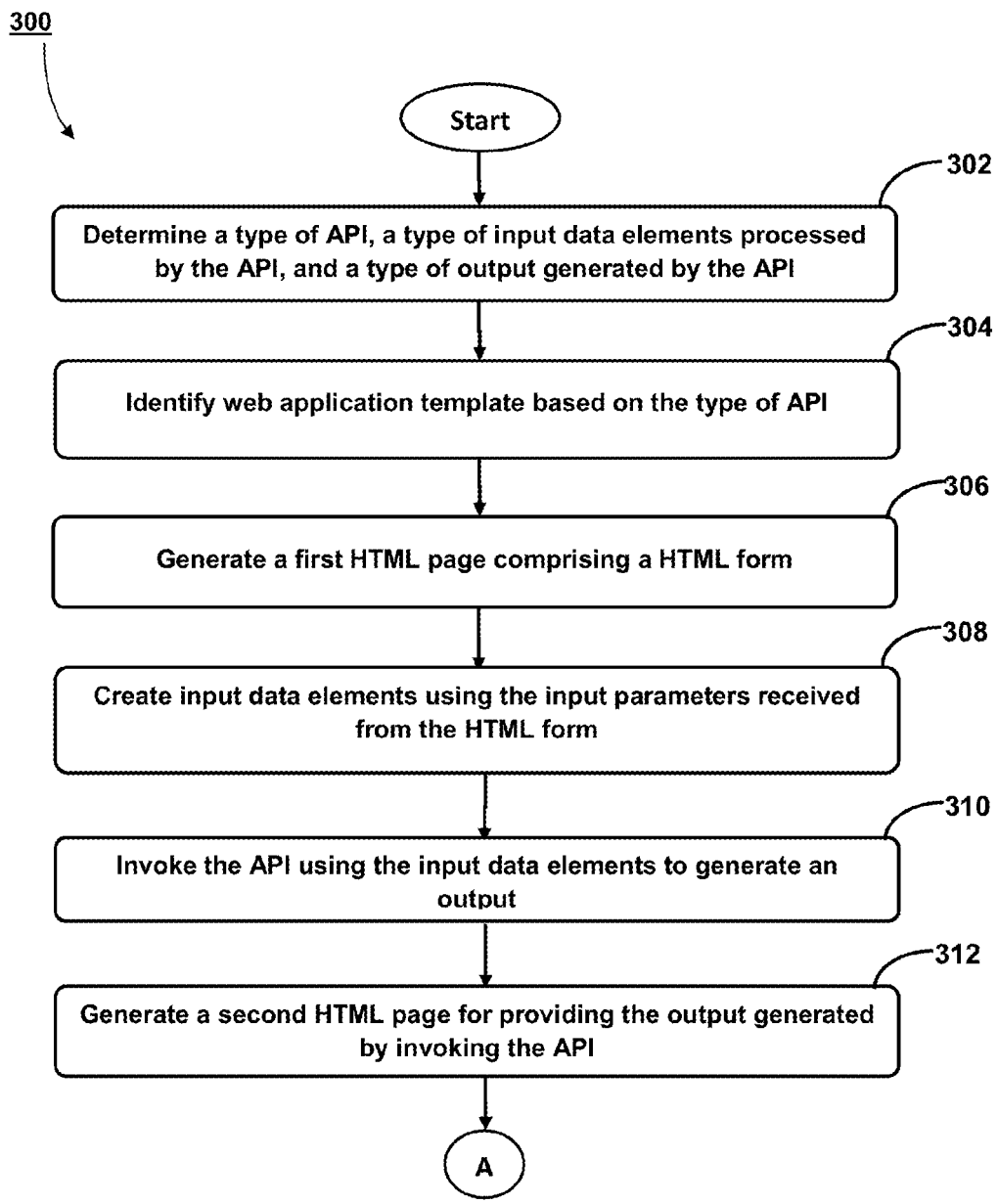
FIG. 3a and FIG. 3b collectively shows a flowchart illustrating a method for automatically testing an API, in accordance with an embodiment of the present subject matter.
Figure 3B:
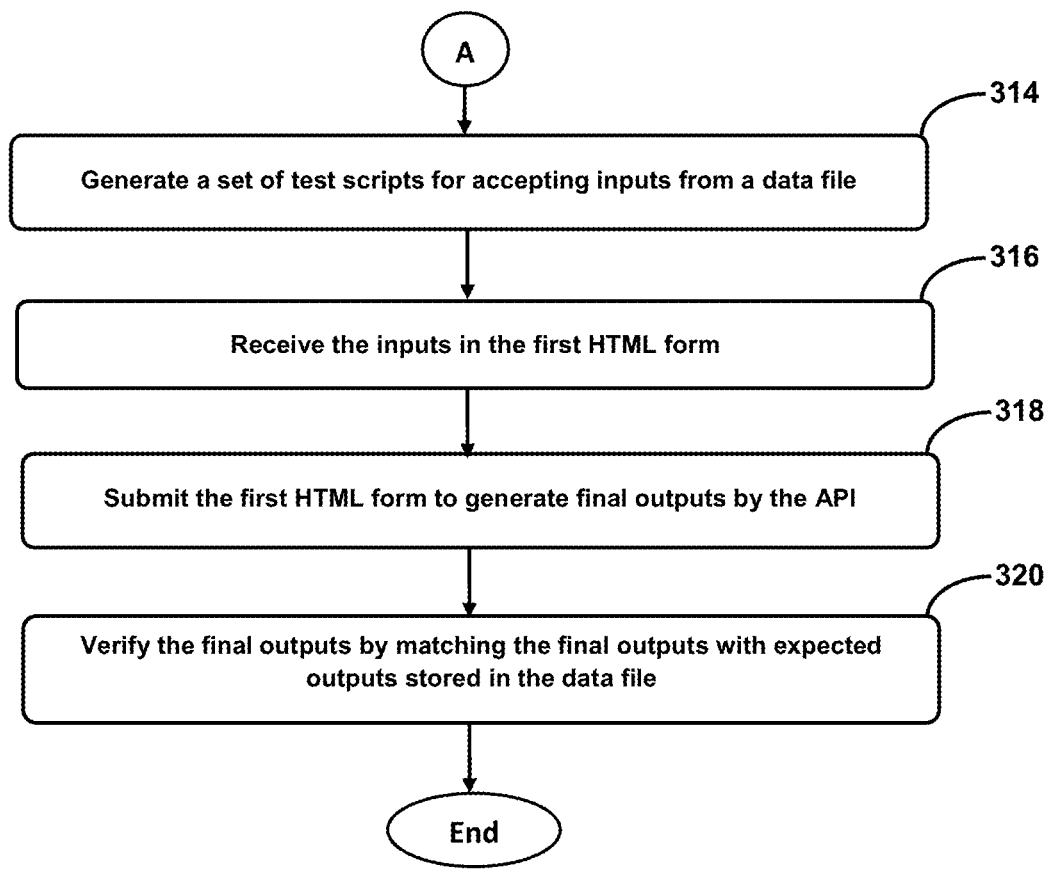

Referring now to FIG. 3a and FIG. 3b, a method 300 for automatically testing an Application Programming Interface (API) is described, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, a type of API, a type of input data elements processed by the API, and a type of output generated by the API may be determined. In one implementation, the type of API, the type of input data elements processed by the API, and the type of output generated by the API, may be determined by the processor 110.

At block 304 a web application template may be identified based on the type of API. In one implementation, the web application template may be identified based on the type of API, by the processor 110.

At block 306 a first HTML page comprising a HTML form may be generated. In one implementation, the first HTML page comprising the HTML form may be generated by the processor 110.

At block 308 input data elements may be created using the input parameters received from the HTML form. In one implementation, the input data elements may be created using the input parameters, received from the HTML form, by the processor 110.

At block 310 a program code for invoking the API may be generated using the input data elements. The API may then be invoked using the program code to generate an output. In one implementation, the program code for invoking the API may be generated, by the processor 110.

At block 312 a second HTML page may be generated for providing the output generated by invoking the API. In one implementation, the second HTML page may be generated for providing the output, generated by invoking the API, by the processor 110.

At block 314 a set of test scripts may be generated for accepting inputs from a data file. In one implementation, the set of test scripts may be generated, by the processor 110.

At block 316 the inputs may be received in the first HTML form. In one implementation, the inputs may be received in the first HTML form, by the processor 110.

At block 318 the first HTML form may be submitted to generate final outputs by the API. In one implementation, the first HTML form may be submitted to generate final outputs by the API, by the processor 110.

At block 320 the final outputs may be verified by matching the final outputs with expected outputs stored in the data file. In one implementation, the final outputs may be verified by matching the final outputs with expected outputs stored in the data file, by the processor 110.

Although implementations for methods and systems for automatically test an Application Programming Interface (API) have been described in language specific to structural features and/or methods, it is to be understood that the appended claims are not necessarily limited to the specific features or methods described. Rather, the specific features and methods are disclosed as examples of implementations for automatically test an Application Programming Interface (API).

Exemplary embodiments discussed above may provide certain advantages. Though not required to practice aspects of the disclosure, these advantages may include those provided by the following features.

Some embodiments may enable a system and a method to automatically create a User Interface (UI) for testing the API's.

Some embodiments may enable a system and a method to generate automation tests/scripts for the UI to automatically test the API's.

Some embodiments may enable a system and a method to enable testing of the API's by a person having insufficient knowledge of programming languages.

We claim:

1. A method for automatically testing an Application Programming Interface (API), the method comprising:
    determining, by a processor, a type of Application Programming Interface (API), a type of input data elements processed by the API, and a type of output generated by the API;
    identifying, by the processor, a web application template based on the type of API, wherein the web application template comprises libraries required for invoking the API;
    generating, by the processor, a first Hyper Text Markup Language (HTML) page comprising a HTML form, wherein the HTML form comprise User Interface (UI) elements to be mapped with input parameters;
    creating, by the processor, input data elements using the input parameters received from the HTML form;
    invoking, by the processor, the API using the input data elements to generate an output;
    generating, by the processor, a second HTML page for providing the output generated by invoking the API, wherein the second HTML page is created based on the type of output generated by the API;
    generating, by the processor, a set of test scripts for accepting inputs from a data file;
    receiving, by the processor, the inputs in the first HTML form;
    submitting, by the processor, the first HTML form to generate final outputs by the API; and
    verifying, by the processor, the final outputs by matching the final outputs with expected outputs stored in the data file, thereby automatically testing the API,
    wherein the API is one of: Representational State Transfer/JavaScript Object Notation (REST/JSON), Representational State Transfer/Extended Markup Language (REST/XML), Simple Object Access Protocol (SOAP), and Normal Java Code.

2. A system for automatically testing an Application Programming Interface (API), the system comprises:
a processor;
a memory coupled to the processor, wherein the processor is capable for executing programmed instructions stored in the memory to:
determine a type of Application Programming Interface (API), a type of input data elements processed by the API, and a type of output generated by the API;
identify a web application template based on the type of API, wherein the web application template comprises libraries required for invoking the API;
generate a first Hyper Text Markup Language (HTML) page comprising a HTML form, wherein the HTML form comprise User Interface (UI) elements to be mapped with input parameters;
create input data elements using the input parameters received from the HTML form;
invoke the API using the input data elements to generate an output;
generate a second HTML page for providing the output generated by invoking the API, wherein the second HTML page is created based on the type of output generated by the API;
generate a set of test scripts for accepting inputs from a data file;
receive the inputs in the first HTML form;
submit the first HTML form to generate final outputs by the API; and
verify the final outputs by matching the final outputs with expected outputs stored in the data file, thereby automatically testing the APL
wherein the API is one of: Representational State Transfer/ JavaScript Object Notation (REST/JSON), Representational State Transfer/Extended Markup Language (REST/XML), Simple Object Access Protocol (SOAP), and Normal Java Code.

3. A non-transitory computer readable medium embodying a program executable in a computing device for automatically testing an Application Programming Interface (API), the program comprising:
a program code for determining a type of Application Programming Interface (API), a type of input data elements processed by the API, and a type of output generated by the API;
a program code for identifying a web application template based on the type of API, wherein the web application template comprises libraries required for invoking the API;
a program code for generating a first Hyper Text Markup Language (HTML) page comprising a HTML form, wherein the HTML form comprise User Interface (UI) elements to be mapped with input parameters;
a program code for creating input data elements using the input parameters received from the HTML form;
a program code for invoking the API using the input data elements to generate an output;
a program code for generating a second HTML page for providing the output generated by invoking the API, wherein the second HTML page is created based on the type of output generated by the API;
a program code for generating a set of test scripts for accepting inputs from a data file;
a program code for receiving the inputs in the first HTML form;
a program code for submitting the first HTML form to generate final outputs by the API; and
a program code for verifying the final outputs by matching the final outputs with expected outputs stored in the data file, thereby automatically testing the APL
wherein the API is one of: Representational State Transfer/ JavaScript Object Notation (REST/JSON), Representational State Transfer/Extended Markup Language (REST/XML), Simple Object Access Protocol (SOAP), and Normal Java Code.

4. The method of claim 1, wherein the UI elements comprise a text box and a combo box, and a calendar, and wherein the input parameters comprise a string, an integer, and a date.

5. The method of claim 1, wherein the UI element mapped with the input parameters comprises at least one of: a textbox mapped with a string, a textbox mapped with an integer, and a combo box mapped with an integer having a predefined range, and a calendar mapped with a date.

6. The system of claim 2, wherein the UI elements comprise a text box and a combo box, and a calendar, and wherein the input parameters comprise a string, an integer, and a date.

7. The system of claim 2, wherein the wherein the UI element mapped with the input parameters comprises at least one of: a textbox mapped with a string, a textbox mapped with an integer, and a combo box mapped with an integer having a predefined range, and a calendar mapped with a date.

* * * * *